(12) United States Patent
Leggett

(10) Patent No.: US 6,239,942 B1
(45) Date of Patent: May 29, 2001

(54) PERFORMANCE OPTIMIZATION MAGNETIC TAPE ASSEMBLY

(76) Inventor: Dennis Leggett, 7109 Sontag Way, Springfield, VA (US) 22153

( * ) Notice: Subject to any disclaimer, the term of this patent is extended or adjusted under 35 U.S.C. 154(b) by 0 days.

(21) Appl. No.: 09/641,344

(22) Filed: Aug. 18, 2000

Related U.S. Application Data

(62) Division of application No. 08/951,488, filed on Oct. 16, 1997, now Pat. No. 6,115,206.

(51) Int. Cl.$^7$ .............................. G11B 15/68; G11B 5/008
(52) U.S. Cl. ............................................. 360/92; 360/96.3
(58) Field of Search ........................ 360/92, 96.1, 96.3, 360/96.5

(56) References Cited

U.S. PATENT DOCUMENTS

| | | | | |
|---|---|---|---|---|
| 3,083,269 | * | 3/1963 | Gaubert | 360/92 |
| 3,158,374 | * | 11/1964 | Nick | 360/92 |
| 3,183,494 | * | 5/1965 | Welsh | 360/92 |
| 3,280,947 | * | 10/1966 | Brewster et al. | 360/92 |
| 3,504,916 | * | 4/1970 | Ban | 360/92 |
| 3,733,078 | * | 5/1973 | Staar | 360/78.03 |
| 3,747,939 | * | 7/1973 | Iwasaki | 360/92 |
| 3,756,487 | * | 9/1973 | Pechi | 226/110 |
| 3,809,827 | * | 5/1974 | Oyaba | 360/106 |
| 3,852,818 | * | 12/1974 | Pyles | 360/92 |
| 3,935,595 | * | 1/1976 | Kondo | 360/92 |
| 4,319,291 | * | 3/1982 | Drubeck et al. | 360/92 |
| 4,698,705 | * | 10/1987 | Umino | 360/92 |
| 4,797,759 | * | 1/1989 | Koizumi et al. | 360/92 |
| 4,879,613 | * | 11/1989 | Koizumi et al. | 360/92 |
| 4,918,548 | * | 4/1990 | O'Donnell et al. | 360/92 |

* cited by examiner

*Primary Examiner*—William Klimowicz

(57) ABSTRACT

A performance optimization magnetic tape assembly includes a plurality of data tape cartridges each having a data tape therein with each data tape cartridge having first and second spools upon with the data tape is wound and with each spool having a hole therethrough. The data tape cartridges are arranged in a stacked relationship with the respective holes of each of said first and second spools co-aligned with one another. A tape transport mechanism for driving selected ones of the first and/or second spools of a particular tape cartridge includes a motor-driven shaft extending through the co-aligned holes of the first spools and/or co-aligned second spools. Clutch assemblies are carried on each shaft and are dynamically re-positionable on said shaft to drive at least a selected one of said spools to move the tape thereon.

5 Claims, 4 Drawing Sheets

PERFORMANCE OPTIMIZATION MAGNETIC TAPE ASSEMBLY

CROSS REFERENCE TO RELATED APPLICATION

This application is a divisional of U.S. patent application Ser. No. 08/951,488, filed Oct. 16, 1997, U.S. Pat. No. 6,115,206.

BACKGROUND OF THE INVENTION

This invention relates to improved data storage tape assemblies. Configurations reducing the average time-to-access data under conditions of load are disclosed.

Computer, audio, and video systems typically require a means of storing large volumes of information (analog and digital). Magnetic tape drives packaged as individual units or packaged as a part of an automated tape library system have been one means for storing this information. Optical tape drives have also been used. Within an automated tape library, mechanisms are provided for sequentially: a) moving a stored tape to one of the provided tape drives (or moving the tape and the tape drive); b) loading the tape; c) advancing the tape to the desired location; d) reading or writing data; e) returning the tape to the starting position; f) unloading the tape; g) and returning the tape to it's storage location. Larger automated tape libraries may provide multiple mechanisms, but even with multiple mechanisms, the operations remain essentially sequential. Overall system performance is a function of the capabilities of the tape movement mechanisms, the loading mechanisms, tape technology, speed of the tape drive, tape length, size of the information to be handled, and location of the information on the tape. Many of today's production systems can take several minutes to complete a full tape operation commencing with picking the tape out of storage and concluding with the return of the tape to a storage location. One product utilizes self-contained tape cartridges with a simple magazine structure to achieve an advertised tape load time of 4 seconds and an average access time of 8 seconds (¼ tape length), for a combined average time-to-data of 12 seconds and an average cycle-time (return tape to starting location) of 20 seconds.

While the prior art has recognized the value of a wide range of design features, those properties may be utilized in combination and in select configurations to: a) enable almost instantaneous (hard disc like delays) access to initial data fragments of a stored information object; b) reduce time-to-data under all conditions; c) increase parallel operations within each logical operation; d) further reduce time-to-data under conditions within which multiple operations are queued; e) reduce overall system costs; and f) further increase physical storage density.

SUMMARY OF THE INVENTION

Accordingly, several objects and advantages of my invention arise from novel constructs which: a) store the initial fragment of an information object, such as a multi-media video clip, on faster devices such as hard discs or in memory, thereby enabling immediate access, and store subsequent fragments on devices with greater delay, and transfer those subsequent fragments to disc or memory during the time provided by the handling of the initial fragment which resided on discs or in memory; b) provide a surplus of independent tape transport (motive) units relative to read/write head assemblies and apply the surplus tape transport units to the task of pre-positioning randomly specified tapes to any approximate starting location to minimize head delay in preparation for reading or writing; c) mount the head assemblies on a lightweight platform with a motive mechanism enabling rapid positioning over the appropriate tape media; d) provide configurations within which one or more heads may service a given number of tapes; e) provide configurations within which multiple head assemblies may be positioned to simultaneously operate on one tape; f) provide configurations within which a pair of heads assemblies are dynamically paired for read after write operations and alternately operate independently to maximize overall read operation performance; g) provide the control mechanisms to enable these components to operate successfully together; h) configure one or more spools of magnetic tape within a single assembly; i) provide vibration damping mechanisms; j) configure multiple spool tape housings within which at least one tape spool is permanently housed and at least one tape spool may be removed and replaced.

DESCRIPTION OF THE PREFERRED EMBODIMENT

Figure 1:
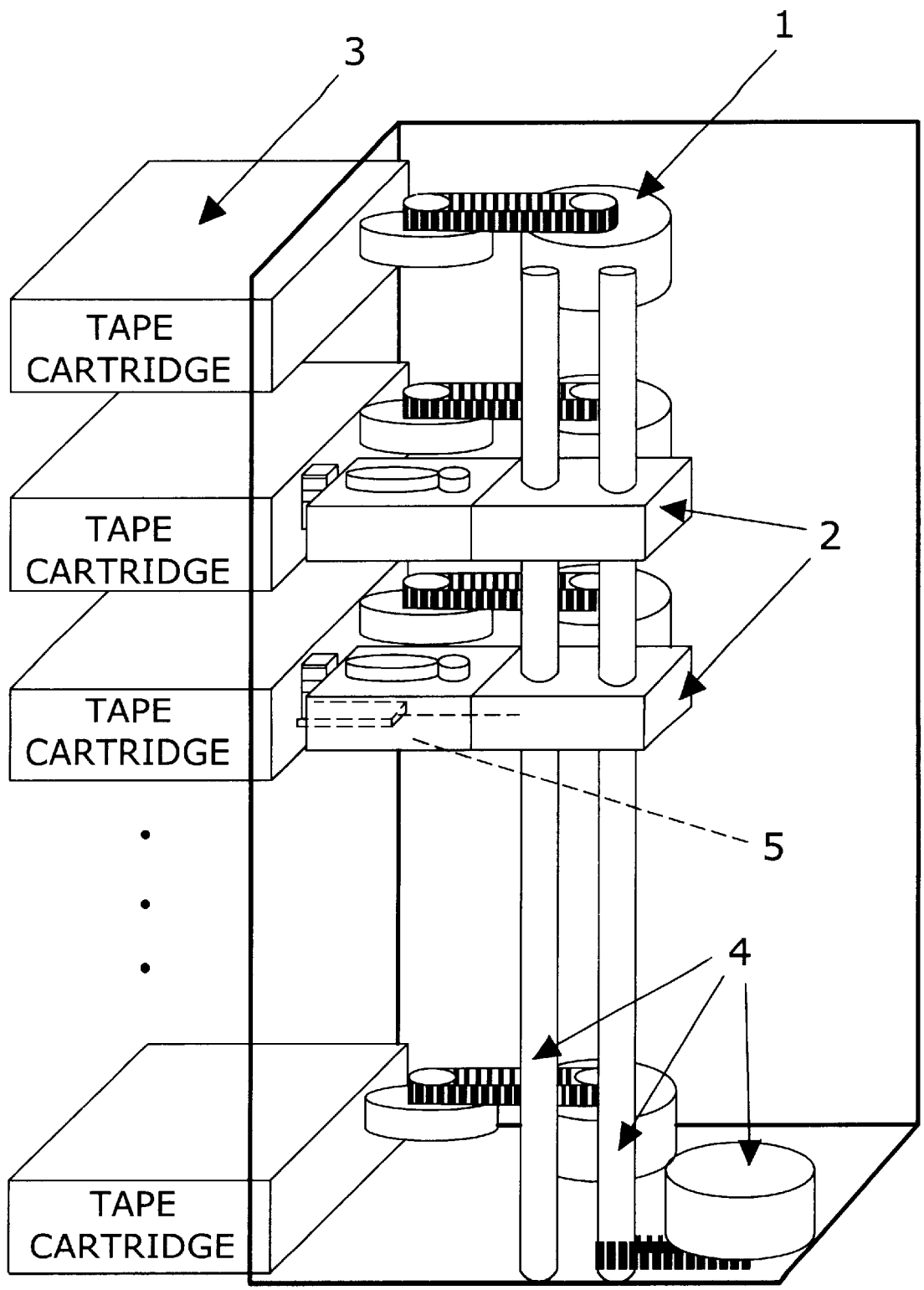
FIG. 1 shows a cutaway view of a representative tape handling assembly.
Figure 2:
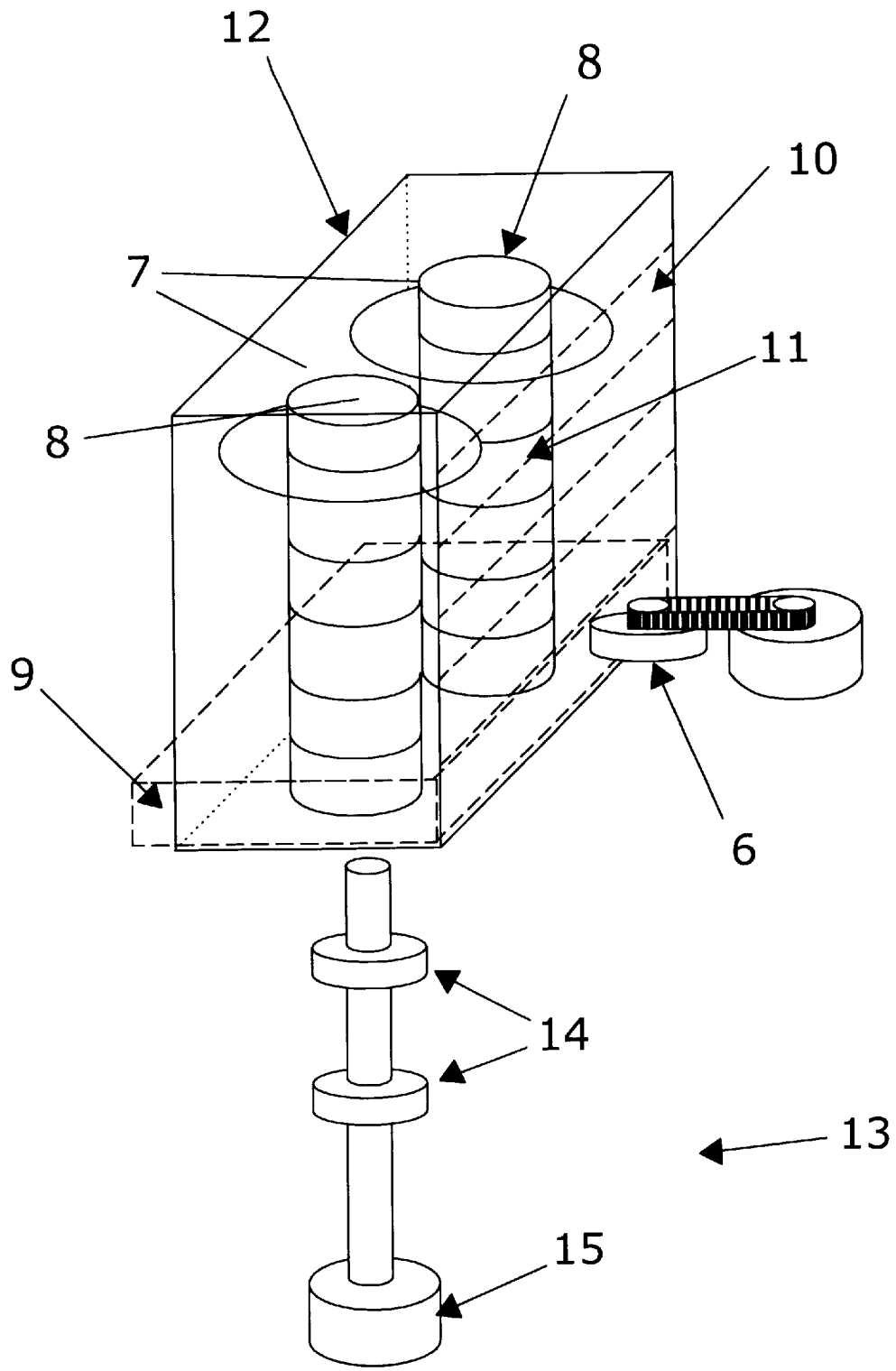
FIG. 2 presents a tape cartridge configuration supporting multiple separate tape spools.

An embodiment of the referenced invention is illustrated in FIGS. 1 and 2. Independent tape transport assemblies 1 are provided to provide the motive force necessary to advance or reverse tape within one cartridge 3 independently of actions performed simultaneously on other of the cartridges 3. The represented tape transport assembly 1 consists of a small electric motor, belt, drive roller, and mechanical supports. The representative tape transport assembly 1 contacts the tape cartridge's 3 protruding belt roller located at the front edge of the cartridge. Other configurations, for other tape configurations, are available including transport contact under the tape spools contained within the cartridge 3. Head assemblies 2 contain the magnetic heads necessary for reading and/or writing from/to the magnetic tape. A variable number of tape cartridges 3 may be configured. Individual tape cartridges 3 may be configured with one or more internal spools of magnetic tape.

A means of relocating the head assemblies 2 between tape cartridges is provided. The configuration depicted in FIG. 1 utilizes head assembly repositioning components 4 to move the head assemblies. The head assembly repositioning components 4 move the head assemblies up and down relative to the several tape cartridges 3. Typical constructions include screw actuators or belt drives driven by electric stepper motors. When a head assembly 2 is positioned next to the correct tape cartridge 3, an optional head assembly interlock 5 may be utilized to insure a stable linkage between the tape cartridge 3 and the head assembly 2. A typical interlock 5 mechanism would use a solenoid actuated pin or plate. Fine track adjustment may be provided by the head assembly repositioning components 4 or by a separate fine adjustment mechanism (stepper motor or voice coil driven assemblies are viable alternatives) built into the head assembly 2.

Various mechanical configurations may be employed to minimize adverse impacts (vibration read/write head misalignment) of movement of selected head assemblies, or repositioning of tape media, while other head assemblies are reading/writing data.

The configuration depicted in FIG. 1 uses one set of head assembly repositioning components 4 to reposition two or more head assemblies 2. This approach relies upon a interlock mechanism within the head assembly 2 to engage the head assembly repositioning components at the times appropriate for moving the head assembly 2. A typical interlock mechanism would use a solenoid actuated pin or clamp to engage the screw actuator or belt. When the interlock mechanism is disengaged on one or more head assemblies 2, the head assembly repositioning components 4 may be used to relocate other head assemblies which have engaged their respective interlock mechanisms. In this fashion selected head assemblies 2 may be accessing data while other head assemblies 2 are in the act of relocating.

Control procedures may be applied which optimize the movement of heads between tapes and minimize the number of conflicts when moving head assemblies. While one configuration of head assembly repositioning components 4 is depicted, it's depiction does not limit the configurations available for relocating the head assemblies. Other configurations, including configuration of motive mechanisms as part of each head assembly are part of this overall approach.

FIG. 1 depicts a fixed tape transport assembly 1 for each tape cartridge 3. Alternately these tape transport assemblies 1 may be relocated using repositioning components similar to 4 or other configurations including those within which repositioning mechanisms are configured as part of each tape transport assembly. Within this configuration, there may be fewer tape transport assemblies 1 than tape cartridges 3, but more than head assemblies 2. An additional advantage of a configuration which utilizes re-locatable tape transport assemblies 1, is adaptive support for cartridge 3 configurations with differing inter-tape spacing. For instance, multiple tape cartridges 3 could be configured as one physically unified assembly or mounted within a single tape housing. One tape housing generation could have a one inch inter-tape spacing, another generation could have a ¾ inch inter-tape spacing, while yet another generation could have a ½ inch inter-tape spacing.

FIG. 1 depicts a single head assembly 2 in contact with a single tape cartridge 3. The head assemblies 2 and the tape cartridges 3 may be configured to enable multiple head assemblies 2 to simultaneously access a single tape cartridge 3. For instance, during writing operations one head assembly may be writing to tape while a second head assembly follows the same tracks and reads what has just been written to verify it's accuracy.

During read operations, the head assemblies 2 may operate independently, thereby achieving twice the actual throughput. For instance, multiple head repositioning assemblies 4 each with one or more head assemblies 2, could be aligned parallel to one another in such a fashion that the head assemblies 2 could slide past one another and where multiple head assemblies 2 could be applied simultaneously to a single tape cartridge 3.

FIG. 1 depicts separate tape cartridges 3. Multiple tape spools may be configured as part of a single assembly to reduce overall cost and to increase physical tape packaging density. A representative "dense pack" assembly 12, housing multiple tape spools, is presented in FIG. 2. The multiple tape spools may be assembled within a single purpose-built housing, or by mechanically linking or bonding individual housings, such as Quarter Inch Cartridge (QIC). This multiple tape spool approach reduces overall physical space required and can be applied to reduce costs by reducing required housing materials and/or separate tape magazines. For each configuration discussed as part of FIG. 2, various mechanical configurations may be employed to minimize adverse impacts of movement of selected head assemblies, or repositioning of tape media, while other head assemblies are reading/writing data.

Vibration damping materials, such as polymer spacers, may be utilized to minimize the adverse impacts of moving tape(s) while read or write operation on other tape(s). Software control mechanisms may also be utilized to suspend read or write operations during the most abrupt mechanical operations.

Three alternative methods for moving the tape are represented.

A first drive method involves individual tape spools configured with internal belt drives (as in QIC units) may be driven by an external roller 6 as shown in FIG. 2. Adjacent stacking of QIC units will require modification to the base plate to enable light used for end-of-tape recognition to enter between adjacent tapes.

A second drive method utilizes relatively large diameter hollow tape spools 7 in shown in FIG. 2. The tape transport mechanism 13 would be inserted through the hollow tube 8 formed by these stacked tape spools. The inserted transport mechanism may be configured with one or more clutch assemblies 14 which would be dynamically positioned to simultaneously drive one or more tape spools 7. These clutch assemblies 14 may be configured to enable each of the driven spools 7, within a single assembly 12, to operate independently, including operations in which one or more spools 7 are driven in one direction while one or more other spools 7 are driven in the opposite direction. Motive force could be provided by one motor 15 per hollow tube 8 or by an individual motor associated with each clutch assembly 7. This drive method eliminates the need for an internal drive belt assembly required by the first alternative.

The third drive method utilizes large tape spool supports 10 and 11 which slightly protrude from the housing. A tape transport assembly 6 would be utilized to drive each tape spool 10 and 11 to control tape tension. Electronic motor controls and tension monitors would control the speed and rotational position of each spool to maintain appropriate tension.

Optionally one or more tape cartridges 9 could be configured such that it may be individually removed from the housing 12. This configuration enables a new multitape housing configuration to maintain compatibility with existing tape housing standards such as the ¼ inch belt drive mini-cartridge QIC series.

Figure 3:
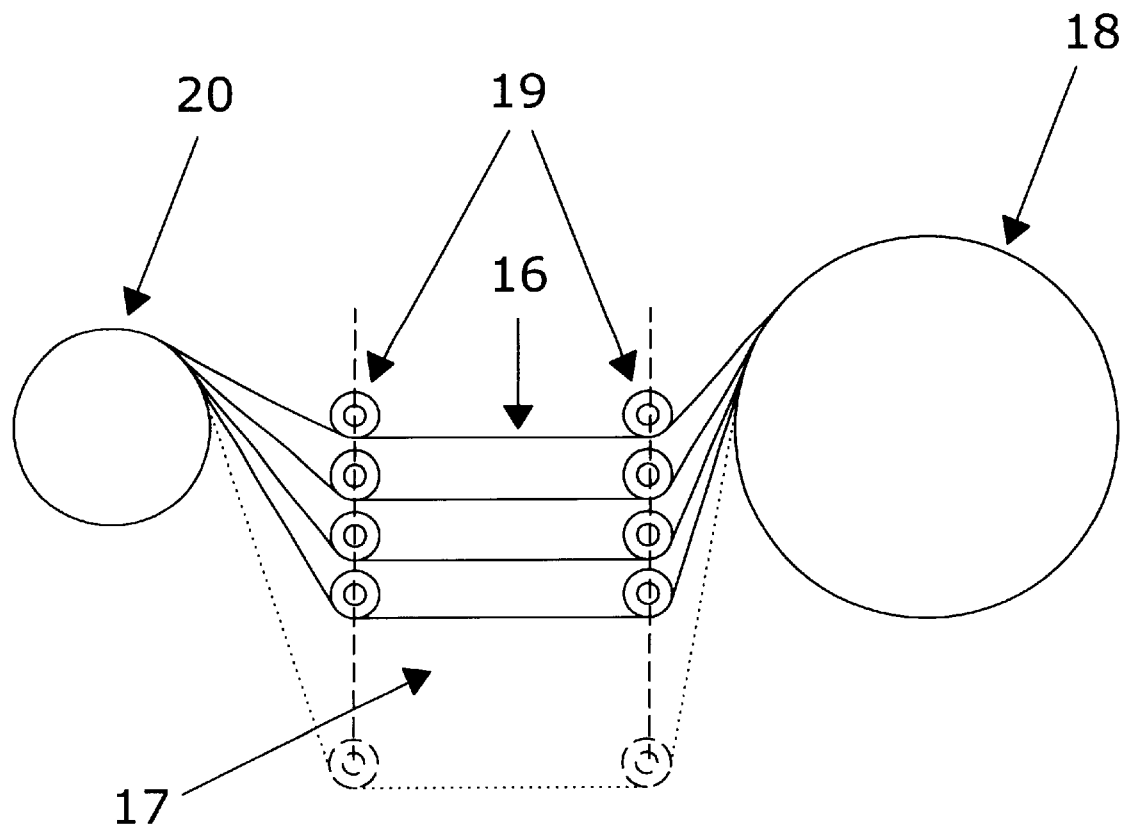
FIG. 3 presents a tape cartridge configuration supporting multiple tape layers with only one primary tape source spool and one or more tape take-up spools.

As presented in FIG. 3, average access time may also be reduced by winding multiple independent tapes 16,17 on a single primary source spool 18 and passing the multiple independent tapes through a series of tape guides 19 to one or more take-up spools 20. Consistent tension may be maintained by movable tape guides 19 or by use of multiple take-up spools 20. In this fashion, 400 feet of tape (four 100 foot segments) could provide the storage capacity of 400 feet of tape but only require the transit time of 100 feet of tape. The configuration of FIG. 3 reduces the average time required to reposition the head assembles at a desired location, for a given quantity of tape. The head assemblies would be inserted through the space between adjacent tape layers. As with the housing depicted in FIG. 2, several of these (multiple independent tape) spools may also be stacked on top of each other, further increasing the capacity of a cartridge.

Figure 4:
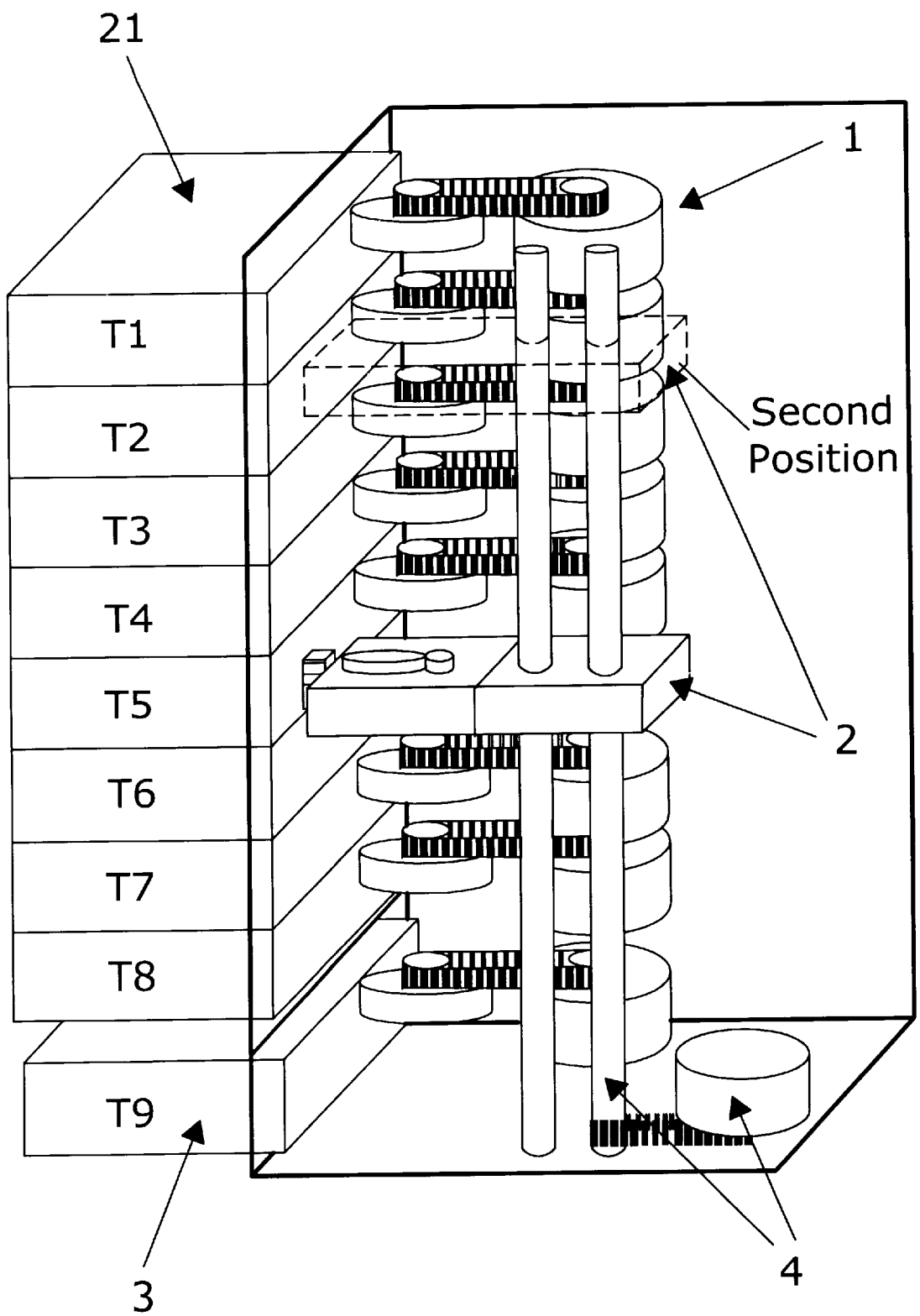
FIG. 4 presents one possible configuration for an operational tape handling assembly.

The method of operation is as follows. A cutaway view of a small configuration is presented in FIG. 4. A typical configuration will also include a power supply and control electronics. A multiple tape spool assembly 21 is inserted into the system. In this configuration, the assembly consists of eight independent tape spools (TI through T8). An individual tape spool (T9) assembly 3 may also be inserted. The host computer system would initialize the storage system by reading appropriate directory information and pre-loading appropriate segments onto disc or into main memory. As requests are processed by the host computer system, initial information would be transferred from the segments stored on disc or in main memory. The following operating sequence assumes that the host desires to retrieve information from tape spool T5 and T2. As indicated in FIG. 4, the head assembly 2 has been positioned to tape T5. While information is transferred from tape T5, the host would instruct the tape system to pre-position tape T2 to the appropriate desired location. When the information transfer for tape T5 is completed, the head is quickly moved to tape T2 where, due to the previous independent parallel pre-positioning operation, information transfer can commence immediately without the delay encountered by other systems which must then advance the tape to the desired location. This scenario represents a principal benefit of this invention. This invention enables parallel operations where, during a given time period: a) one or more tapes may be in the process of being pre-positioned to the desired location; b) information may be written to or read from one or more tapes (dependent upon the number of heads and associated electronics modules configured); and c) one or more tapes may be repositioned to the optimum ready position. The tape system may also be used for traditional data storage operations such as backup, archival, and hierarchal storage functions.

As will be apparent to those skilled in the art, various changes and modifications may be made to the illustrated performance optimization magnetic tape assembly of the present invention without departing from the spirit and scope of the invention as determined in the appended claims and their legal equivalent.

What is claimed is:

1. A tape transport system for positioning respective tapes in a plurality of data tape cartridges, comprising:

a plurality of data tape cartridges each having a data tape therein, each data tape cartridge having at least first and second spools upon with the data tape is wound, each spool having a hole therethrough, said data tape cartridges organized relative to one another so that the respective holes of each of said first and second spools are co-aligned;

a tape transport mechanism for driving selective ones of at least one of said first or second spools of a tape cartridge, said tape transport mechanism including a motor-driven shaft extending through the co-aligned holes of at least one of said co-aligned first spools or co-aligned second spools and having at least one clutch assembly coaxially thereon dynamically re-positionable coaxially on said shaft to drive at least a selected one of said spools to move the tape thereon.

2. The tape transport system of claim 1, wherein said tape transport mechanism comprises:

a motor-driven shaft extending through the co-aligned holes of one of said co-aligned first spools or co-aligned second spools and another motor-driven shaft extending through the co-aligned holes of the other of said co-aligned first spools or co-aligned second spools, each of said shafts including a plurality of clutch assemblies thereon dynamically re-positionable on their respective shaft to drive at least a selected one of said spools to move the tape thereon.

3. The tape transport system of claim 2, wherein said tape transport mechanism comprises:

wherein a one of said motor-driven shafts selectively drives a clutched spool in a first direction and the other of said motor-driven shafts drives a clutched spool in a second direction.

4. The tape transport system of claim 1, further comprising:

at least two head assemblies movable independently to anyone of said data tape cartridges to effect a data transferring engagement with a data tape in a selected one of said data tape cartridges, said plurality of data tape cartridges greater in number than said at least two head assemblies.

5. The tape transport system of claim 1, further comprising:

at least one head assembly movable independently to anyone of said data tape cartridges to effect a data transferring engagement with a data tape in a selected one of said data tape cartridges.

* * * * *